July 24, 1962 P. BONNAFOUX 3,045,280
PELLET MILL AND FEEDER THEREFOR
Filed July 10, 1959 3 Sheets-Sheet 1

INVENTOR.
PAUL BONNAFOUX
BY Thomas P. Mahoney
ATTORNEY

INVENTOR.
PAUL BONNAFOUX
BY Thomas P. Mahoney
ATTORNEY

July 24, 1962 P. BONNAFOUX 3,045,280
PELLET MILL AND FEEDER THEREFOR
Filed July 10, 1959 3 Sheets-Sheet 3
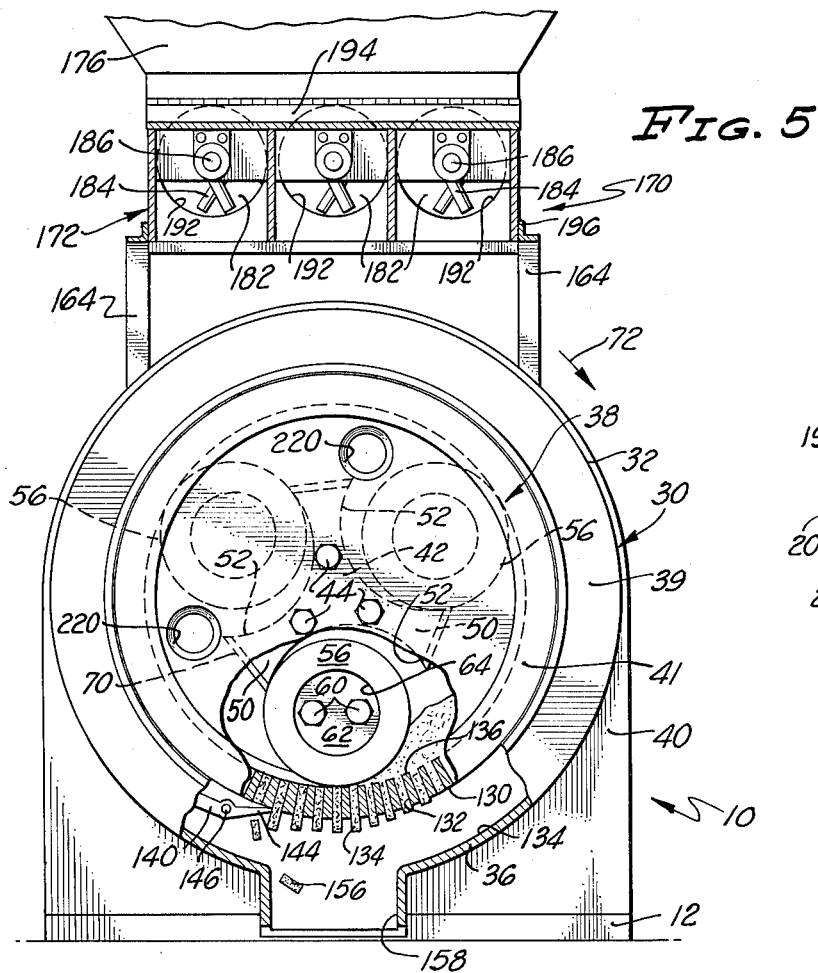
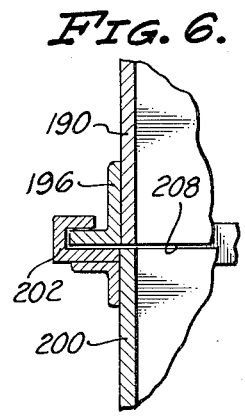
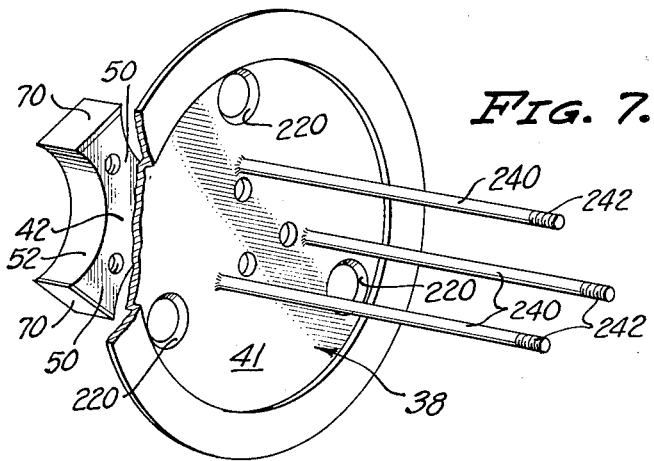
INVENTOR.
PAUL BONNAFOUX
BY Thomas P. Mahoney
ATTORNEY

United States Patent Office 3,045,280
Patented July 24, 1962
::::

3,045,280
PELLET MILL AND FEEDER THEREFOR
Paul Bonnafoux, 44409 Stanridge Ave., Lancaster, Calif., assignor of twenty percent to Thomas P. Mahoney, Los Angeles, Calif., twenty-six percent to Marie B. Bonnafoux, Lancaster, Calif., and twenty-six percent to Yvonne Bonnafoux
Filed July 10, 1959, Ser. No. 826,227
5 Claims. (Cl. 18—12)

This invention relates to a rotary pellet mill of the character wherein comminuted feeds and the like are fed into the mill and extruded thereby in the shape of hard glossy pellets of cylindrical cross section. More particularly, this invention relates to a rotary pellet mill of the aforementioned character which has operatively associated therewith, and constituting a part thereof, feeder means adapted to accomplish the automatic and continuous feeding of the feed or other substance being acted upon by the pellet mill to appropriate locations in the pellet mill.

Conventional rotary pellet mills usually include a housing having an inlet for the comminuted and moistened feed or other material, and an outlet from which the pellets formed in the mill from said comminuted feed may be discharged.

Conventional rotary pellet mills usually include a rotary die member which is driven by a drive shaft upon which it is mounted and which encompasses one or more rotary extrusion rollers which are mounted internally of the rotary die and which engage the interior diameter thereof to extrude material through radial die openings formed in the wall of the rotary die.

Feeder means is usually associated with the pellet mill to cause the continuous flow of feed or other material thereto. The problem encountered in conventional pellet mills utilizing conventional feeding means is that adequate and carefully metered flow of material to the pellet mill is not usually achieved.

Furthermore, with conventional pellet mills considerable difficulty is encountered during the disassembly thereof to replace worn component parts or to adjust the mechanism thereof since the feeder means must first be disconnected from its operative relationship with the pellet mill and the pellet mill itself then disassembled.

It is, therefore, an object of my invention to provide a rotary pellet mill which includes as a constituent part thereof feeder means which can be readily mounted upon and in operative relationship with the associated pellet mill and which can also be dismounted therefrom with equal facility.

Another object of my invention is the provision of a pellet mill of the aforementioned character, which, because of the unique cooperative relationship between the feeder means and the housing of the mill, can be readily and easily dismounted to permit access to be had to the component parts thereof.

Another object of my invention is the provision of feeder means for a pellet mill including a plurality of inlet orifices whereby continuous and equal flow of the material being fed to said orifices can be accomplished in order to achieve adequate distribution of the material being fed to the component parts of the pellet mill.

A rotary pellet mill of the general character of that which constitutes a part of the combination disclosed herein is disclosed in United States Patent No. 2,870,481 for Rotary Pellet Mill, issued January 27, 1959. Reference is also made to my co-pending application Ser. No. 757,078 filed August 25, 1958 for Pellet Mill of which this application constitutes a continuation-in-part.

The present invention constitutes an advance over the mills disclosed in said patent and patent application in that it provides a composite pellet mill and feeder therefor which can be easily assembled and disassembled as the need arises.

Other objects and advantages of my invention will be apparent from the following specification and accompanying drawings which are for the purpose of illustration only and in which:

FIG. 5 is a vertical, partly sectional view taken on the broken line 5—5 of FIG. 3;

FIG. 6 is an enlarged, fragmentary, sectional view taken on the broken line 6—6 of FIG. 2; and FIG. 7 is a perspective view showing certain component parts of the pellet mill and feeder mechanism of my invention.

Figure 1:
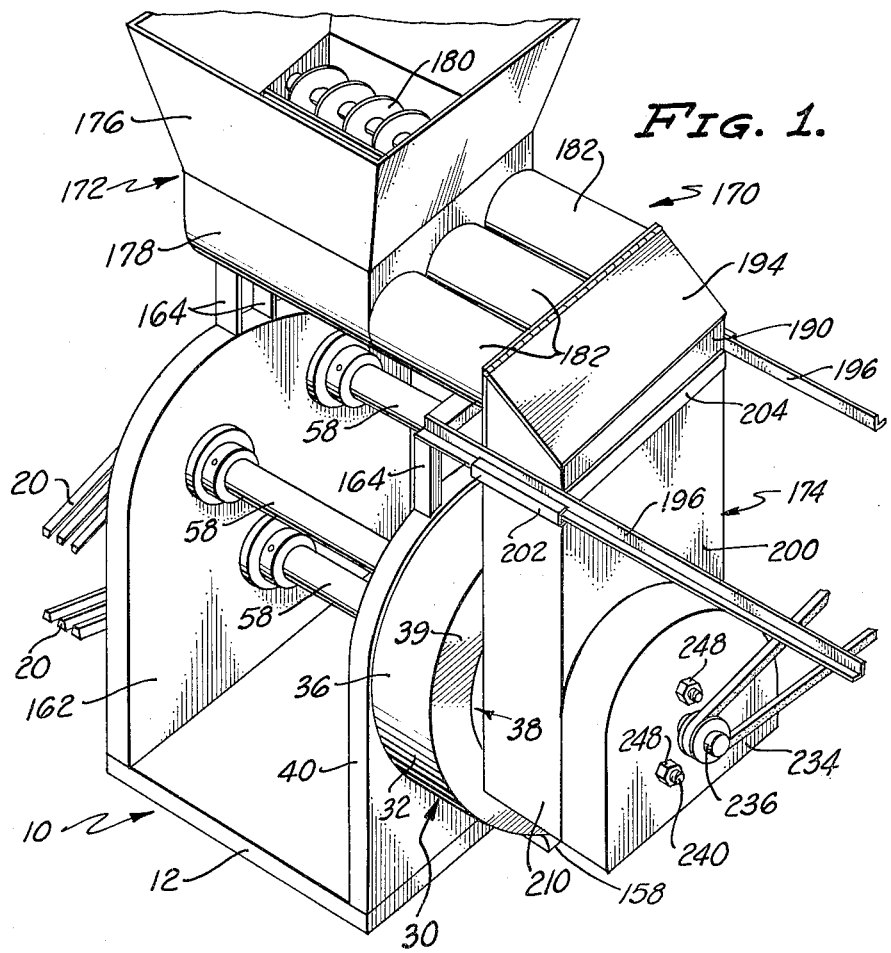
FIG. 1 is a perspective view of a combined rotary pellet mill and feeder therefor constructed in accordance with the teachings of my invention.
Figure 3:
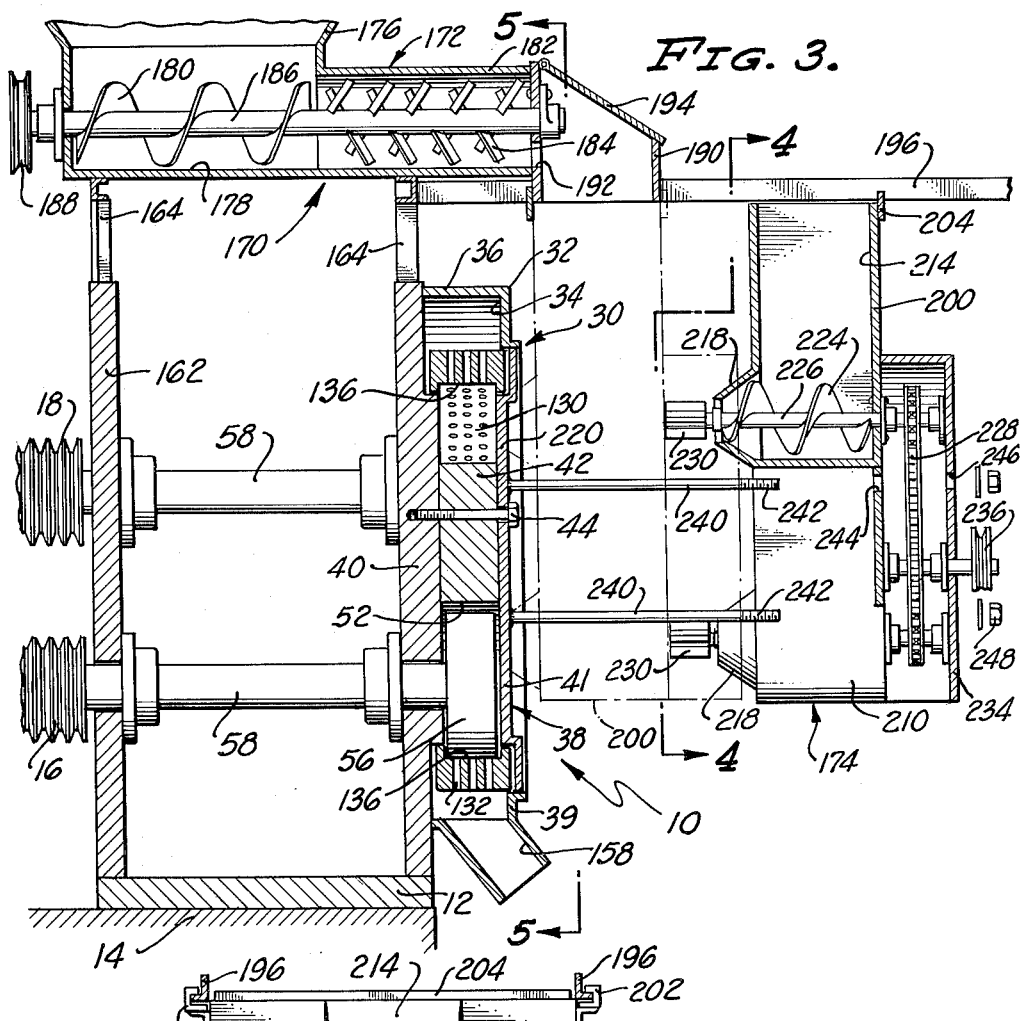
FIG. 3 is a vertical, sectional view showing the manner in which the feeder mechanism can be dismounted from operative engagement with the associated pellet mill.

Referring to the drawings and particularly to FIGS. 1, 3 and 5 thereof, I show a pellet mill 10 constructed in accordance with the teachings of my invention and mounted on a bed 12. The bed 12 is constituted by a flat, substantially rectangular plate adapted to be superimposed on a supporting surface 14, as best shown in FIG. 3 of the drawings. The pellet mill 10 is adapted to be driven by means of sheaves 16 and 18 having drive belts 20 connected thereto and to an appropriate source of motive power such as an electric motor, not shown.

Figure 2:
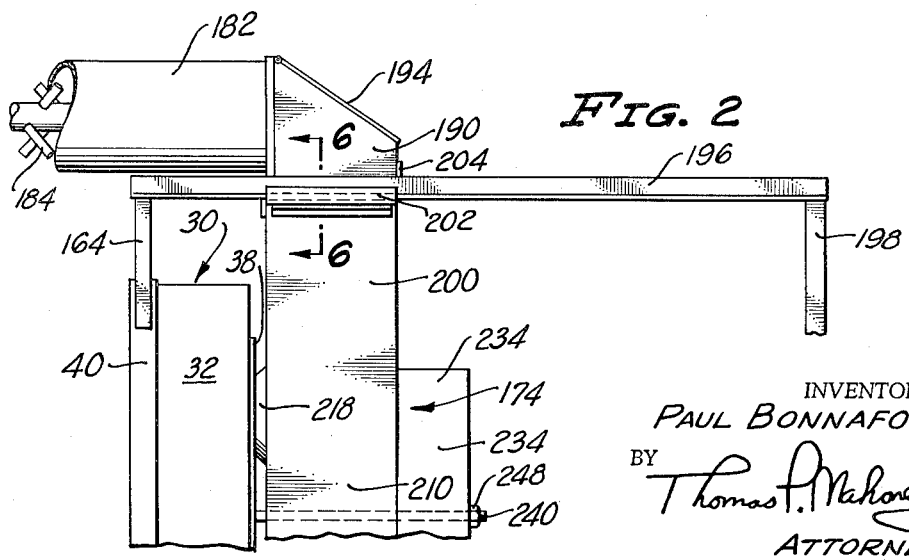
FIG. 2 is a fragmentary, side elevational view of the pellet mill feeder mechanism.
Figure 4:
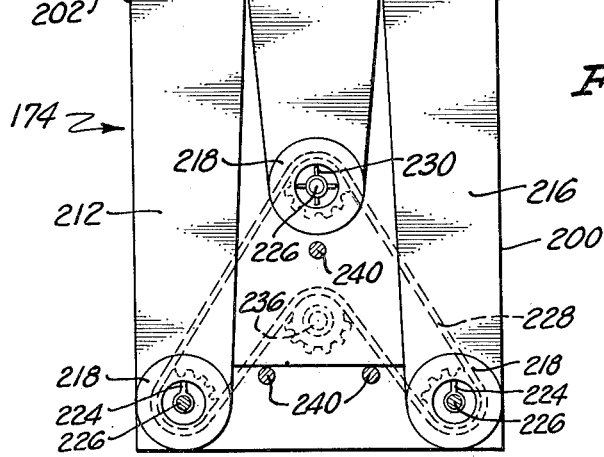
FIG. 4 is a vertical, partly sectional view taken on the broken line 4—4 of FIG. 3.

Also mounted upon the bed 12 is the housing 30 of the pellet mill 10 which, as best shown in FIGS. 1-2 and 4 of the drawings, includes a substantially circular portion 32 defining a chamber 34, said circular portion having a perimetrical, circular wall 36, a front wall 38, and a rear wall 40. The circular portion 32 of the pellet mill housing 30 has a partition member 42 mounted in and centrally of the chamber 34 defined thereby, said partition member being secured in operative relationship with the circular portion 32 of the pellet mill housing 30 by means of bolts 44 which extend, respectively, through and into the front and rear walls 38 and 40, respectively, of said circular portion. The front wall 38 of the housing is actually separated into two parts, namely, a first, perimetrical part 39 formed integrally with the circular wall 36 and a removable part 41.

The partition member 42 incorporates three radially extending legs 50 which define three recesses 52 having arcuate walls of gradually increasing radius, for a purpose which will be described in greater detail below. Mounted within the chamber 34 is a plurality of extrusion rollers 56, each roller, as best shown in FIGS. 3 and 5 of the drawings, being secured in operative engagement with the extremity of an associated drive shaft 58 by means of bolts 60 which are threaded into the extremity of the associated drive shaft 58 and which secure a retainer plate 62 in operative engagement with said extremity of said drive shaft and a shoulder 64 formed in the side of the roller 56.

It will be noted that each of the rollers, as best shown in FIGS. 3 and 5 of the drawings, is located in one of the recesses 52 defined by the radially extending legs 50 of the partition member 42 and that the arcuate walls defining the recesses 52 have the perimeters of the extrusion rollers 56 juxtaposed thereto only at the portions of said walls adjacent one of the legs 50 defining an associated recess 52. Mounted upon the extremities of the legs 50 are cutters 70 which serve, by impinging upon the perimeter of an associated extrusion roller 56, to clear material impacted thereupon from the perimeter thereof.

However, as the rollers 56 are rotated upon the associated drive shafts 58 in a clockwise direction as indicated by the arrow 72 in FIG. 5 of the drawings, the side walls defining the recesses 52 are spaced inwardly from the perimeters of the rollers 56, thus preventing the possibility that the rollers 56 may bind upon said arcuate side walls and lock said rollers against rotation.

Mounted upon the extrusion rollers 56 is a rotary die 130, said rotary die including a plurality of die openings 132 for the extrusion of material therethrough in the form of cylindrical bars 134, as best shown in FIG. 5 of the drawings. The rotary die 130 includes a continuous groove or track 136 on its interior diameter, the side walls of which embrace the contiguous edges of the extrusion rollers 56 in order to properly align the rotary die 130 with the extrusion rollers 56. Therefore, when the extrusion rollers 56 are rotated, corresponding rotation of the rotary die 130 will take place causing the extrusion rollers 56 to extrude cylindrical bars 134 of material through the die openings 132.

Mounted on the radially extending front wall portion 39 of the perimetrical circular wall 36 are pellet cutters 140 one of which is shown in FIG. 5 of the drawings. Each of the pellet cutters 140 is pivotally mounted on an associated bolt 146 and is adapted to be adjusted to cause the cutter blade 144 thereof to be moved inwardly or outwardly with respect to the perimeter of the rotary die 130 to cause the lengthening or shortening of the bodies 156 broken from the extruded tubular rods 134. When the bodies 156 are severed by the cutters 140, they fall through a discharge opening 158 and are conveyed by conveyor means, not shown, to an appropriate storage or packing area.

Mounted in operative relationship with the bed 12 upon the rear wall 40 of the pellet mill housing 30 and upon the vertical support 162 by means of brackets 164 is the feeder means 170 constituting a component part of the pellet mill of the invention. The feeder means 170 includes a horizontally oriented portion 172 and a vertically oriented portion 174, the horizontally oriented portion 172 being located over the pellet mill housing 30 and the vertically oriented portion 174 depending in front of and being juxtaposable to the front wall 38 of the housing 30 in a manner to be described in greater detail below.

The horizontally oriented portion 172 includes a hopper 176 for the reception of the material to be treated, said hopper terminating in a chamber 178 wherein are located three augers 180 adapted to individually feed material to be treated into three tubes 182 having agitators 184 mounted for rotation therein. The agitators 184 and the augers 180 are mounted for simultaneous rotation on shafts 186, said shafts projecting beyond the confines of the feed means 170 and having sheaves 188 mounted upon the extremities thereof to permit said shafts to be rotated by appropriate power means.

The vertical portion 174 of the feeder means includes a top section 190 in communication with the outlet orifices 192 of the tubes 182 and an access door 194 can be opened to determine the flow of material to be treated through the section 190. The lower extremity of the top section 190 has its lower extremity secured, as by means of welding, between track members 196 whose inner extremities are fastened to the brackets 164 mounted on the top of the back wall 40 of the pellet mill housing 30 and whose forward extremities are supported upon vertical supports 198. A bottom section 200 of the vertical portion 174 is adapted to cooperate with the top section 190 and is secured in operative and movable relationship with the track members 196 by means of flanges 202 mounted on the opposite edges thereof. A baffle plate 204 is secured to the top edge of the bottom section 200 to baffle the space 208 between the top section 190 and the bottom section 200.

The bottom section 200, as best shown in FIGS. 1, 3 and 4, includes a substantially rectangular exterior housing 210 which shrouds three vertical channels 212, 214 and 216. The upper extremity of each of the channels 212, 214 and 216 is disposed below the respective outlet 192 of a tube 182 and is adapted to receive the material discharged therefrom. The material flows downwardly by gravity into the lower end of the respective channel and each of the channels terminates in a frusto-conical protuberance 218 which is adapted to be received, as best shown in FIGS. 2 and 3, in a corresponding inlet opening 220 in the front plate 38 of the pellet mill housing 30. Mounted in the lower extremity of each of the channels 212, 214 and 216 is a feed auger 224 rotatable on a shaft 226 and driven by a chain drive 228. The outer extremity of the shaft 226 incorporates a paddle 230 which is adapted to extend through the associated inlet opening 220 in the pellet mill to cause the material fed from the respective vertical channel to flow properly toward the associated roller 56. The chain drive is encompassed in a housing 234 and driven by a common drive member 236 from an associated source of motive power.

Secured to the face of the front wall portion 41 of the pellet mill housing 30 is a plurality of studs 240, the securement of said studs being preferably accomplished by means of welding or the like. The outer extremities of the studs 240 are threaded, as at 242, and are adapted to be inserted in corresponding openings 244 and 246 in the housings 210 and 234. When so inserted, nuts 248 are threaded upon the threaded extremities 242 thereof that project beyond the housing 234 of the chain drive 228 and the vertical portion 174 of the feed means 170 is thus secured in operative engagement with the pellet mill housing in the manner shown in FIGS. 1 and 2 of the drawings.

Normally, material to be treated is dumped in the hopper 176 and flows by gravity into the chamber 178 whence it is expelled by means of the augers 180 into the tubes 182. In the tubes 182 the material is subjected to the agitation of the agitators 184 and, if desired, to steam treatment, or the like. The treated material is then expelled through the orifices 192 and flows downwardly by gravity through the vertical channels 212, 214 and 216.

Upon reaching the bottoms of the respective channels 212, 214 and 216, the material is engaged by said augers 224 and expelled through the openings at the outer extremities of the frusto-conical portions 218 into the associated inlet openings 220 in the front wall 38 of the pellet mill housing 30 whence it is driven by the associated paddle 230 into juxtaposition to the appropriate roller 56, as best shown in FIG. 5 of the drawing.

During this operation the vertical portion 174 of the feeder means 170 is maintained in operative and intimate engagement with the pellet mill housing 30. However, as frequently happens, if it should be necessary to obtain access to the interior of the chamber 34 of the pellet mill housing 30, the nuts 248 may be released from the threaded extremities 242 of the studs 240. When this has been accomplished, the lower section 200 of the vertical portion 174 of the feeder means 170 can be slid outwardly on the track members 196 by means of the operative engagement of the flanges or channels 202 upon the upper extremity of the lower portion 200 with the track members 196.

When the housing 210 of the lower portion 200 of the vertical section 174 of the feeder means 170 has cleared the outer extremities of the studs 240, the bolts 44 may be released from operative engagement with the back wall 40 of the pellet mill housing 30. This will permit the front plate portion 41 of the pellet mill housing 30 to be released from operative engagement with the pellet mill housing 30 and also permit the partition member 42 to be dismounted from operative engagement from the back wall 40 of the pellet mill housing 30. The chamber 34 of the pellet mill housing 30 is thus exposed for repair or dislodgement of compacted material by a simple operation taking a minimum amount of time and labor.

When the needed repair or dislodgement of compacted material or other servicing has been accomplished, the partition 42 and the front plate 38 are mounted in operative engagement with the housing 30 by securing them to the back wall 40 of the housing 30 through the expedient of the bolts 44. After this has been accomplished, the lower portion 200 of the vertical section 174 is pushed into juxtaposition to the pellet mill housing 30 and slid inwardly on the rails 196. The paddles 230 enter the inlet openings 220 in the front plate 38 and are thus located in the chamber 34 of the pellet mill housing 30 while the frusto-conical protuberances 218 are registered in the openings 220. When such registry has been accomplished, the nuts 248 are threaded upon the studs 240 and the pellet mill and associated feeder means are ready for operation.

I thus achieve by my invention a compact pellet mill, feeder means combination which facilitates the accurate and uniform feeding of material to be treated to various locations in the pellet mill and which also facilitates the dismounting of the feeding means and associated portions of the pellet mill to permit easy access to be had to the interior of the chamber defined by the pellet mill housing.

I claim:

1. In a pellet mill, the combination of: a housing; a foraminous, pelletizing die rotatable in said housing; rollers located in said housing in contact with said die for extruding pellets therethrough; a supporting frame connected to said housing; track means connected to said frame; and material feeding means mounted in overlying relationship with said housing and having a portion mounted on and depending from said track means and movable into juxtaposition to and away from said housing thereupon.

2. In a pellet mill, the combination of: a housing having a plurality of material receiving openings therein; a foraminous, pelletizing die rotatable in said housing; rollers located in said housing in contact with said die for extruding pellets therethrough; a supporting frame connected to said housing; track means connected to said frame; and material feeding means mounted in overlying relationship with said housing and having a portion mounted on and depending from said track means having material outlet means juxtaposable to said material receiving openings and movable into juxtaposition to and away from said housing thereupon.

3. In a pellet mill, the combination of: a housing having a front plate incorporating a material receiving opening; pellet extruding means mounted for movement in said housing in juxtaposition to said front plate and adapted to receive material from said opening; and material feeding means mounted over said housing and having a material outlet portion juxtaposable to said material receiving opening, and an operative connection to said housing including track means whereby said material outlet may be moved toward or away from said housing to respectively juxtapose or separate said opening and said outlet.

4. In a pellet mill, the combination of: a housing having a demountable front plate secured thereupon, said front plate incorporating a material receiving opening; pellet extruding means located and movable in said housing for receiving material through said opening; material feeding means mounted over said housing and incorporating a material outlet portion registerable with said opening, and an operative connection between said housing and material outlet portion including track means on which said material outlet portion is suspended for movement to or from said housing; and fastening means for securing said feeding means to said front plate.

5. In a pellet mill, the combination of: a housing having a demountable front plate secured thereupon, said front plate incorporating a plurality of material receiving openings therein; pellet extruding means located and movable in said housing for receiving material through said openings; material feeding means mounted over said housing and incorporating an outlet portion having a plurality of material outlets registerable with said openings, and an operative connection between said housing and outlet portion including track means on which said outlet portion is suspended for movement to or from said housing; and fastening means for securing said feeding means to said front plate.

References Cited in the file of this patent

UNITED STATES PATENTS

| | | |
|---|---|---|
| 2,103,860 | Mazzeo | Dec. 28, 1937 |
| 2,391,638 | Meakin | Dec. 25, 1945 |
| 2,870,481 | Bonnafoux | Jan. 27, 1959 |
| 2,961,700 | Meakin | Nov. 29, 1960 |